US009501706B2

(12) United States Patent
Williams, Jr. et al.

(10) Patent No.: US 9,501,706 B2
(45) Date of Patent: Nov. 22, 2016

(54) DEVICE STAND FOR POINT-OF-SALE MOBILE DEVICES

(71) Applicant: FIRST DATA CORPORATION, Greenwood Village, CO (US)

(72) Inventors: Charles R. Williams, Jr., Houston, TX (US); Mollie Hellige, Houston, TX (US); Corey Sze-Suen Chao, Sugar Land, TX (US)

(73) Assignee: First Data Corporation, Greenwood Village, CO (US)

( * ) Notice: Subject to any disclaimer, the term of this patent is extended or adjusted under 35 U.S.C. 154(b) by 25 days.

(21) Appl. No.: 14/329,637

(22) Filed: Jul. 11, 2014

(65) Prior Publication Data

US 2015/0016707 A1    Jan. 15, 2015

Related U.S. Application Data

(60) Provisional application No. 61/844,945, filed on Jul. 11, 2013.

(51) Int. Cl.
| | |
|---|---|
| *G06K 9/00* | (2006.01) |
| *G06K 9/18* | (2006.01) |
| *G06Q 20/04* | (2012.01) |
| *G07G 1/00* | (2006.01) |
| *G06Q 20/32* | (2012.01) |

(52) U.S. Cl.
CPC ............ *G06K 9/186* (2013.01); *G06Q 20/042* (2013.01); *G06Q 20/32* (2013.01); *G07G 1/0081* (2013.01)

(58) Field of Classification Search
None
See application file for complete search history.

(56) References Cited

U.S. PATENT DOCUMENTS

| | | | |
|---|---|---|---|
| 2008/0135610 A1* | 6/2008 | Roh .............................. | 235/379 |
| 2010/0150424 A1* | 6/2010 | Nepomniachtchi et al. . | 382/140 |
| 2012/0171656 A1* | 7/2012 | Shen ........................ | G09B 5/14 |
| | | | 434/365 |

* cited by examiner

*Primary Examiner* — Atiba O Fitzpatrick
(74) *Attorney, Agent, or Firm* — Sutherland Asbill & Brennan LLP (57) ABSTRACT

This disclosure describes systems, methods, and computer-readable media related to employing adaptive multi-feature semantic location sensing methods to estimate the semantic location of a mobile device. An image of a transaction document may be captured. The captured image to a processing server for processing magnetic ink character recognition (MICR) information from the captured image of the transaction document may be transmitted. A processing result of processing the MICR information from the captured image of the transaction document may be received. The processing result of the MICR information with the captured image of the transaction document may be compared. In response to the comparison, the MICR information to a payment verification server may be submitted for verification.

14 Claims, 7 Drawing Sheets

DEVICE STAND FOR POINT-OF-SALE MOBILE DEVICES

RELATED APPLICATION

This application claims priority to U.S. Ser. No. 61/844,945, titled "Device Stand for Point-of-Sale Mobile Devices," filed Jul. 11, 2013, the contents of which are incorporated herein by reference.

FIELD OF THE DISCLOSURE

The disclosure generally relates to a point-of-sale (POS) system, and more particularly relates to device stands for POS mobile devices.

BACKGROUND

Point-of-sale (POS) systems process retail transactions, typically where a customer makes a payment to a merchant in exchange for goods and/or services. POS systems may include different hardware and software to meet the requirements of the retailer. With the advancement in technology, many POS devices may include mobile devices, such as tablets, smartphones, wearable devices, handheld devices, and any portable device with POS functionality. The mobile devices may be able to scan codes associated with items and calculate a total amount due, as well as identify any incentives, such as coupons or points, that may be applied to the transaction.

BRIEF SUMMARY OF THE DISCLOSURE

Some or all of the above needs and/or problems may be addressed by certain embodiments of device stands for point-of-sale (POS) mobile devices disclosed herein. According to an embodiment, a device stand for POS mobile devices may include a base. One or more arms may extend from the base. The one or more arms may be mounted to a platform. The platform may have an extended lip perpendicular to a lower edge. A connector for a tablet may be integrated into the platform. A camera may be integrated into the platform. The camera may be placed on one or more sides of the platform. The base may have an extended lip perpendicular to a front edge. A magnetic ink character recognition (MICR) reader may be integrated into the extended lip of the base or may be integrated into the platform. The base may include an angular member in view of a camera integrated into the platform. In some embodiments, the angular member may extend from one edge of the base to an opposite edge of the base. In some embodiments, the angular member may include an extended lip along a lower edge to allow a check to rest on the angular member.

Other embodiments, features, and aspects of a device stand for POS mobile devices will be apparent or will become apparent to one with skill in the art upon examination of the following figures and the detailed description. All other features and aspects, as well as other system, method, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Described below are embodiments of a device stand for POS mobile devices (as well as individual components of the device stand for POS mobile devices). In certain embodiments, having a device stand for POS mobile devices enables consistent capture of one or more images of checks or other payment devices for processing or otherwise providing a convenient method to capture data associated with the check or other payment device via a magnetic ink character recognition (MICR) reader. MICR is a character recognition technology primarily used by the banking industry to facilitate processing and clearance of checks and other documents. MICR encoding is typically printed along the bottom of a document, such as a check, and may include a document type indicator, a bank code, a bank account number, a check number, the amount, and other control indicators. It is understood that the MICR reader may capture and analyze one or more portions of a document; for example, capturing a portion of the check that may contain MICR encoding along the bottom of the check.

In some embodiments, the MICR reader may communicate with one or more payment devices, such as systems that may provide additional functionality, such as check verification (e.g., TeleCheck™) or payment verification systems. Other embodiments may include optical character recognition (OCR) functionality that may convert information from scanned or photographed documents, by using an integrated camera, into editable and searchable data.

The device stand for POS mobile devices may also provide a convenient way to dock and charge a mobile device, such as a tablet, a smartphone, a wearable device, a handheld device, or other device with POS functionality, while continuing to process transactions associated with checks or other payment devices. For example, a POS mobile device may connect to the device stand through a connector that may be located within the device stand. In some embodiments, the device stand for POS mobile devices may transmit data captured via a camera and/or a MICR reader through a wired connection, such as a mobile device connector integrated into the stand or through a wireless and/or optical connection provided by the stand.

In one embodiment, a device stand for POS mobile devices may include a base with a lip along an edge of the base extending substantially orthogonally from the base, wherein the lip may include a MICR reader, an arm extending substantially orthogonally from the base, and a platform for supporting a mobile device attached to the arm, wherein the platform may include a camera, a MICR reader, and a connector for the mobile device. It is understood that the placement of the MICR reader in either the platform or the base is only an example of locations for the MICR reader and that any other locations for the MICR reader may be implemented.

In one aspect of an embodiment, the device stand for POS mobile devices may include an angular member positioned along the interior side of the lip and may further include a second lip along a lower edge of the angular member.

In one aspect of an embodiment, the device stand for POS mobile devices may include an angular member which extends from one edge of the base to an opposite edge of the base.

In one aspect of an embodiment, the device stand for POS mobile devices may include a platform that is angled downward towards the lip of the base, and may further include a third lip. The platform may be connected to the arm by a pivotal joint which enables the platform to be rotated or pivoted in different directions.

In one aspect of an embodiment, the device stand for POS mobile devices may include a camera that is integrated along an exterior side of the third lip of the platform adjacent to the angular member.

In one aspect of an embodiment, the connector for the mobile device may be integrated along the third lip of the platform on an interior side of the third lip. The connector for the mobile device may be located at different locations on the platform and/or may be located within the arm where the mobile device may be attached. In another embodiment, the connector may be integrated with the pivotal joint which may enable a mobile device to be connected through the connector and enable the mobile device to rotate/pivot around the arm. It is understood that the above are only examples of locations of the connector of the mobile device and that other placements of the connector may be implemented with embodiments of the disclosure.

In one aspect of an embodiment, the connector for the mobile device may include a power supply and a communicative link for a camera and/or a MICR reader.

In one aspect of an embodiment, a wireless and/or optical communicative link can facilitate communications with a camera and/or a MICR reader.

These and other embodiments of the disclosure will be described in more detail through reference to the accompanying drawings in the detailed description of the disclosure that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Embodiments

Figure 1:
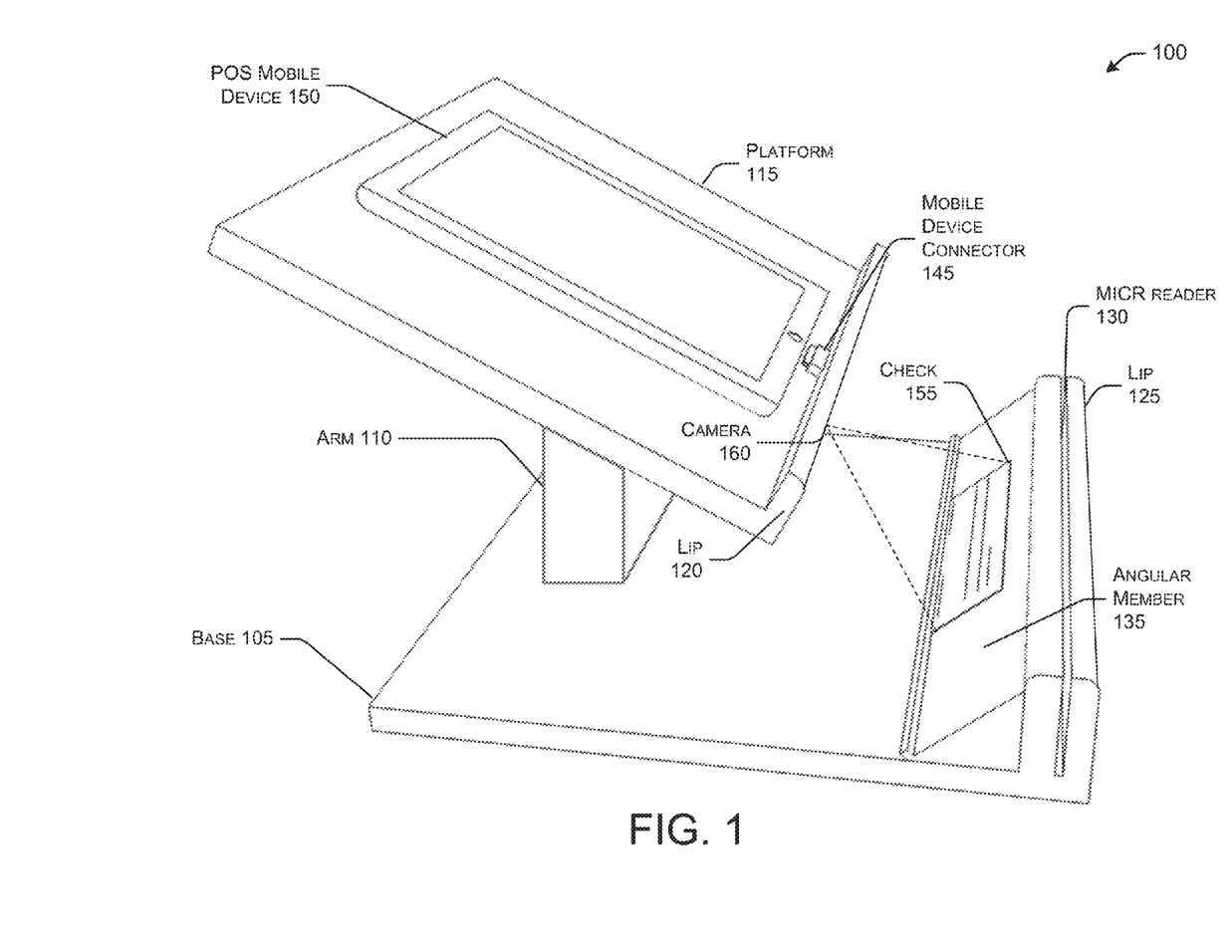
FIG. 1 is a perspective view of an example device stand for POS mobile devices with an associated mobile device, in accordance with one or more embodiments of the disclosure.

FIG. 1 is a perspective view of an example device stand for point-of-sale (POS) mobile devices with an associated mobile device, in accordance with one or more embodiments of the disclosure. In some embodiments, the device stand 100 for POS mobile devices may include a base 105, an arm 110, and a platform 115.

The base 105 may include a lip 125 extending substantially orthogonally along a front edge of the base 105. In some embodiments, the device stand 100 may not include the lip 125. An MICR reader 130 may be integrated into the lip 125 extending from the base 105 of the device stand 100. The MICR reader 130 may be integrated into an upper portion of the lip 125, as depicted. It is understood that the placement of the MICR reader on the lip 125 is only an example of the location of the MICR reader and that other placements within the device stand for POS mobile devices may be implemented. In some embodiments, the MICR reader 130 may be integrated into another portion of the lip 125, such as the outer portion of the lip 125. In some embodiments, the MICR reader 130 may be integrated into a different portion of the device stand 100. For example, the MICR reader 130 may be integrated into the lip 120 of the platform 115, along an edge of the platform 115, along an edge of the base 105, or in the arm 110. In some embodiments, the device stand 100 may not include a MICR reader 130.

The lip 125 may be positioned along a front edge of a base 105. An angular member 135 may be positioned against the lip 125, as depicted in FIG. 1. In some embodiments, the angular member 135 may extend from an edge adjacent to the lip 125 to an opposite edge of the base 105 that is also adjacent to the lip 125. In some embodiments, the angular member 135 may be the approximate length of a typical check 155 (e.g., five to seven inches long) and may be provided along the lip 125 within view of a camera 160. In some embodiments, a lip can be a series of discontinuous raised portions of the front edge of the base 105 or may be a series of raised portions of the base 105 adjacent to the front edge of the base 105.

In some embodiments, the check 155 may be held within the view of the camera 160 such that a picture of the check 155 may be taken by a user, or automatically as the check comes within the view of the camera or by any other means that allow capturing a picture of the check 155.

In some embodiments, a lip 125 may be provided along the lower edge of the angular member 135 to maintain the check 155 proximate to the lip 125. In some embodiments, the angular member 135 may display a suitable location to place the check 155 for the camera 160 to capture an image of the check 155. In some embodiments, the device stand 100 may not include the angular member 135 or the lip 125.

An arm 110 may extend from the base 105. In some embodiments, the arm 110 may extend substantially orthogonally from the base 105. Although depicted as a single arm 110, one or more arms may be provided for the device stand 100. The arm 110 may provide support for a platform 115 to be elevated and positioned above the base 105. In some embodiments, a power source, such as the mobile device connector 145, may be stored in the arm 110 or the base 105 of the device stand 100. In some embodiments, a mechanism providing a connection to the POS mobile device 150 for transmission of data captured via the MICR reader 130 and/or the camera 160 may be provided in the base 105 or the arm 110. The connection may be provided through, but not limited to, infrared means, optical means, a wireless fidelity (WiFi) network, a WiFi Direct network, an NFC connection, a radio network, a cellular network, a GPS network, a ZigBee® connection, a Bluetooth® channel, proprietary protocol connections, and other wireless links, as well as hardwired connections, serial link connections, parallel link connections, or combinations thereof.

In some embodiments, a platform 115 may be mounted to the arm 110. In some embodiments, the arm 110 may be mounted to the platform 115 through a fixed joint. In other embodiments, the arm 110 may be mounted to the platform 115 through a pivotal joint, allowing the platform to pivot or rotate in different directions. For example, during a sale transaction, a merchant may complete an order related to the sale transaction and may request a payment method from the consumer. The merchant may pivot or rotate the platform 115 to be facing the consumer in order for the consumer to select a payment method.

The platform 115 may be mounted to the arm 110 at an angle, as depicted in FIG. 1. The platform 115 may be angled downward towards the angular member 135 of the device stand 100 to enable a camera, such as 160, that may be integrated into the platform 115 to capture images of a check, such as 155, that is positioned on or adjacent to the angular member 135.

The platform 115 may include a lip 120 along a bottom edge of the platform. The lip 120 may extend substantially orthogonally from the platform 115. The platform 115 may be positioned along the lower edge of the platform 115 to maintain a POS mobile device 150 proximate to the platform 115 for access by and display to a user.

In some embodiments, the platform 115 may include a mount which is configured to receive and releasably retain the POS mobile device 150. A power source may be integrated into the mount. The power source may charge the POS mobile device 150 when the device 150 is positioned in the mount. In some embodiments, the power source may be through a mobile device connector 145. In some embodiments, the mobile device connector 145 may be a wired, a wireless, or an optical connection through which the POS mobile device 150 receives data captured by the camera 160 and/or the MICR reader 130.

In some embodiments, a mobile device connector 145 may be integrated into the lip 120 of the platform 115. In some embodiments, the mobile device connector 145 may be integrated along the interior side of the lip 120 of the platform 115, enabling the POS mobile device 150 to be connected while accessed by a user.

The mobile device connector 145 may be a power source for a POS mobile device 150. In some embodiments, the mobile device connector 145 may transmit data captured by the MICR reader 130 and/or the camera 160.

In some embodiments, the camera 160 may be integrated along the exterior side of the lip 120 of the platform 115 and positioned to capture an image of a check 155 that is placed on or adjacent to the angular member 135 of the base 105. In some embodiments, the camera 160 may be integrated into the platform 115 and positioned to capture an image of a check 155. In some embodiments, the camera 160 may be integrated into the arm 110 or base 105 of the device stand 100. Although the device stand 100 depicts the camera 160 integrated along the exterior side of the lip 120 of the platform 115, the camera 160 may be integrated along a different surface of the device stand 100. For example, the camera 160 may be integrated along the underside of the platform 115 and positioned to capture an image of a check 155 that is placed directly below the platform 115 on the base 105. In some embodiments, the device stand 100 may include one or more cameras 160, an MICR reader 130, or a combination thereof.

Figure 2:
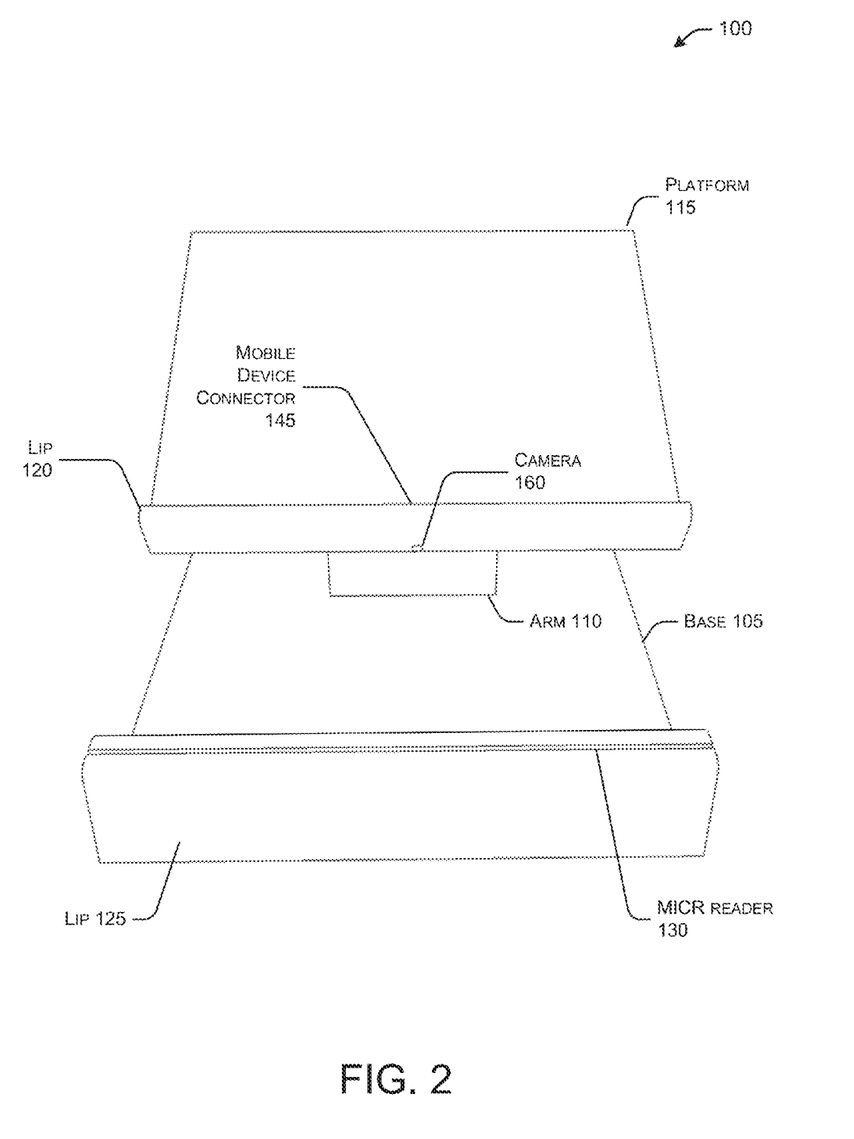
FIG. 2 is a top plan view of an example device stand for POS mobile devices in accordance with one or more embodiments of the disclosure.

FIG. 2 is a top plan view of an example device stand for POS mobile devices in accordance with one or more embodiments of the disclosure. As discussed in relation to FIG. 1, the device stand 100 may include a base 105, an arm 110, and a platform 115. The base 105 may include a lip 125 provided along a front edge of the base 105 and extending substantially orthogonally from the base 105. An MICR reader 130 may be integrated along the upper portion of the lip 125 to enable a user to capture data associated with a check 155. In some embodiments, a different type of reader may be integrated into the base 105. In some embodiments, the MICR reader 130 or a different type of reader may be integrated into a different portion of the base 105 or the lip 125. It is understood that the placement of the MICR reader 130 on the lip 125 is only an example of the location of the MICR reader and that other placements within the device stand for POS mobile devices may be implemented. In some embodiments, the MICR reader 130 may be integrated into another portion of the lip 125, such as the outer portion of the lip 125. In some embodiments, the MICR reader 130 may be integrated into a different portion of the device stand 100. For example, the MICR reader 130 may be integrated into the lip 120 of the platform 115, along an edge of the platform 115, along an edge of the base 105, or in the arm 110.

The arm 110 may extend substantially orthogonally from the base 105 and may be connected to a platform 115. In some embodiments, the platform 115 may be connected to the arm 110 at a fixed angle. In some embodiments, the platform 115 may be connected to the arm 110 by a pivotal joint which enables the platform 115 to be rotated or pivoted in different directions.

A camera 160 may be integrated into the platform 115. The camera 160 may be used to capture an image of a check 155 for processing in association with a transaction. The camera 160 may be positioned along a lip 120 along a lower edge of the platform 115. In some embodiments, the camera 160 may be integrated into the exterior side of the lip 120. In some embodiments, the camera 160 may be integrated along a different portion or edge of the platform 115, the arm 110, or the base 105 of the device stand 100. For example, a camera may be integrated into one side of the platform 115, such that a user may hold the check in the range of the camera lens. The camera 160 may capture one or more portions of the check and may allow a POS mobile device to analyze the one or more portions of the check. The one or more portions of the check may contain MICR encoding found at the bottom of the check, which may be verified by additional functionality, such as check verification (e.g., TeleCheck™) or payment verification systems. Additionally/alternatively, a merchant may manually enter the MICR information into the POS mobile device 150.

Other embodiments may include optical character recognition (OCR) functionality that may convert one or more portions of the check into editable and searchable data. For example, an image of the check 155 may be captured by the camera 160 where the captured image may be further processed through OCR to convert characters, text, and digits into editable and searchable data. In case of discrepancy between the editable and searchable data and the check 155, the converted data may be modified/corrected as necessary by the POS mobile device 150 or by the merchant in order to match the check 155.

In some embodiments, a mobile device connector 145 may be integrated into the platform 115. The mobile device connector 145 may be positioned on an interior side of the lip 120 provided along the lower edge of the platform 115. In other embodiments, the mobile device connector 145 may be located in other portions of the platform 115.

Figure 3:
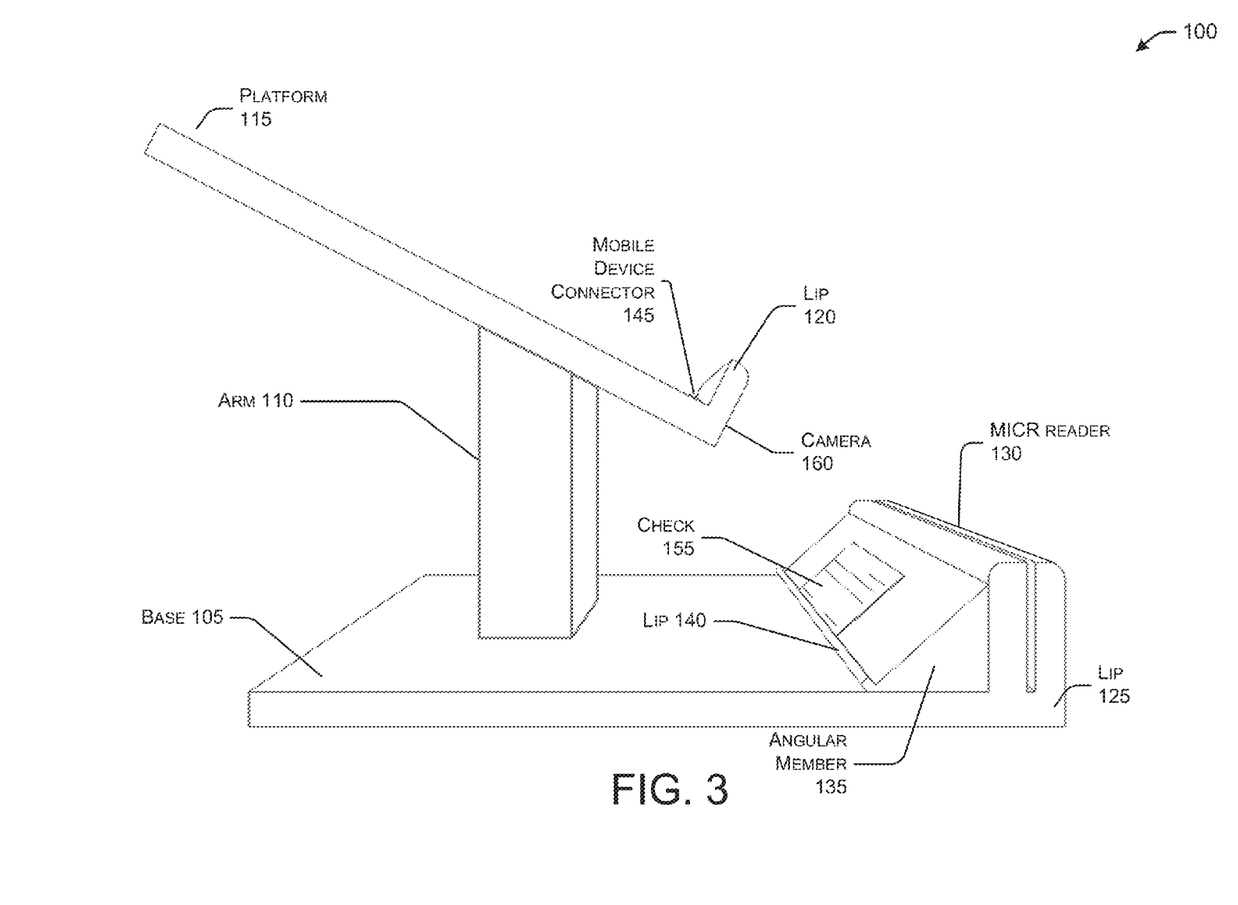
FIG. 3 is a left side elevational view of an example device stand for POS mobile devices in accordance with one or more embodiments of the disclosure.

FIG. 3 is a left side elevational view of an example device stand 100 for POS mobile devices 150, in accordance with one or more embodiments of the disclosure. The device stand 100 may include a base 105, an arm 110, and a platform 115. The base 105 may include a lip 125. The lip 125 may include a MICR reader 130. An angular member 135 may be provided along the interior side of the lip 125 and may be used to place a check 155 in view of the camera 160. The angular member 135 may include a lip 140 along its lower edge to maintain the position of the check 155 proximate to the platform 115 and keep the check 155 in place for the camera 160 to capture an image of the check 155.

The arm 110 may extend from the base 105 and may be provided to elevate and support the platform 115. The platform 115 may include a mobile device connector 145 and/or a camera 160. The mobile device connector 145 may be positioned along the interior side of a lip 120 provided along the lower edge of the platform 115. The camera 160 may be positioned along the exterior side of the lip 120 provided along the lower edge of the platform 115.

Figure 4:
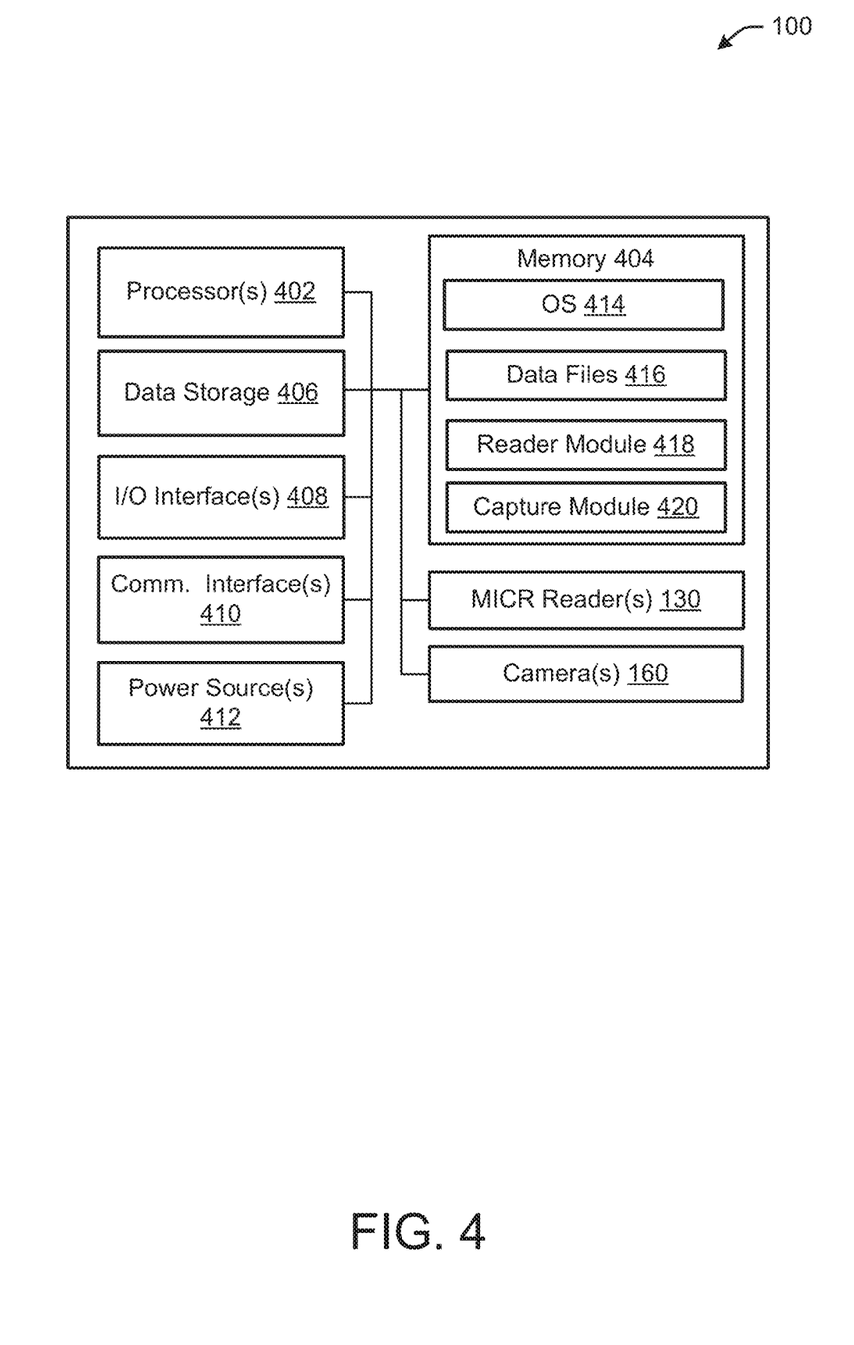
FIG. 4 is a schematic diagram of an example device stand for POS mobile devices in accordance with one or more embodiments of the disclosure.

FIG. 4 is a schematic diagram of an example device stand for POS mobile devices in accordance with one or more embodiments of the disclosure. The device stand 100 may comprise one or more processors 402, one or more memories 404, data storage 406, one or more input/output (I/O) interfaces 408, one or more communication interfaces 410, one or more power sources 412, one or more MICR readers 130, and one or more cameras 160. The one or more processors 402 may individually comprise one or more cores and may be configured to access and execute, at least in part, instructions stored in the one or more memories 404. The one or more memories 404 may comprise one or more computer-readable storage media (CRSM). The one or more memories 404 may include, but are not limited to, random access memory (RAM), flash RAM, magnetic media, optical media, and so forth. The one or more memories 404 may be volatile in that information is retained while providing power or non-volatile in that information is retained without providing power.

The device stand 100 may further include additional data storage 406 such as removable storage and/or non-removable storage including, but not limited to, magnetic storage, optical disk storage, and/or tape storage. Data storage 406 may provide non-volatile storage of computer-executable instructions and other data. The memory 404 and/or the data storage 406, removable and/or non-removable, are examples of CRSM.

The one or more I/O interfaces 408 may also be provided in the device stand 100. These I/O interfaces 408 allow for coupling devices, such as keyboards, joysticks, touch sensors, cameras 160, MICR readers 130, microphones, speakers, haptic output devices, memory, and so forth, to the device stand 100 and/or the POS mobile devices 150.

The one or more communication interfaces 410 may provide for the transfer of data between the device stand 100 and the POS mobile devices 150 directly, via a network, or both. The communication interfaces 410 may include, but are not limited to, personal area networks (PANs), wired local area networks (LANs), wireless local area networks (WLANs), wireless wide area networks (WWANs), and so forth. The communication interfaces 410 may utilize acoustic, radio frequency, optical, or other signals to exchange data between the device stand 100 and the POS mobile device(s) 150.

One or more power source(s) 412 may be included in the device stand 100. The power source 412 may be an external power source which may be used to power the various devices described herein. In some embodiments, the power source 412 may be used to provide power to charge a POS mobile device 150.

One or more MICR readers 130 may be included in the device stand 100. The MICR reader 130 may be used to read the encoding that is typically printed along the bottom of a document, such as a check 155. For example, the MICR readers 130 may capture MICR encoding or information containing codes printed along the bottom of the check 155. The codes may include a document type indicator, a bank code, a bank account number, a check number, the amount, and other control indicators.

The one or more memories 404 may store instructions for execution by the processor 402 to perform certain actions or functions. These instructions may include an operating system (OS) 414 configured to manage hardware resources, such as the I/O interfaces 408, and provide various services to applications executing on the processor 402. The applications executing on the processor 402 may be built-in applications and/or third-party applications (e.g., IOS apps, Android apps, etc.) The one or more memories 404 may also store data files 416 containing information about the operating system 414.

A reader module 418 may be stored in the one or more memories 404. The reader module 418 may receive or access information associated with the MICR reader(s) 130.

The capture module 420 may be stored in the one or more memories 404. The capture module 420 may be associated with the one or more cameras 160, which may be included in the device stand 100 or the POS mobile device 150 that may capture an image of a document (e.g., the check 155). The capture module 420 may capture the image of the check 155 and may process various information contained within the captured image of the check 155. For example, some information may be MICR information containing codes that may be typically printed along the bottom of the document, such as a check, and may include a document type indicator, a bank code, a bank account number, a check number, the amount, and other control indicators. The capture module 420 may also provide text recognition features, such as optical character recognition (OCR) functionality, that may convert information from scanned or photographed documents, such as a check, into editable and searchable data.

Within the one or more memories 404, one or more modules may be stored. As used herein, the term module designates a functional collection of instructions that may be executed by the one or more processors 402. For convenience of description, and not by way of limitation, separate modules are described. However, it is understood that in some implementations, the various functions provided by the modules may be merged, separated, and so forth. Furthermore, the modules may intercommunicate or otherwise interact with one another, such that the conditions of one affect the operation of another.

Figure 5:
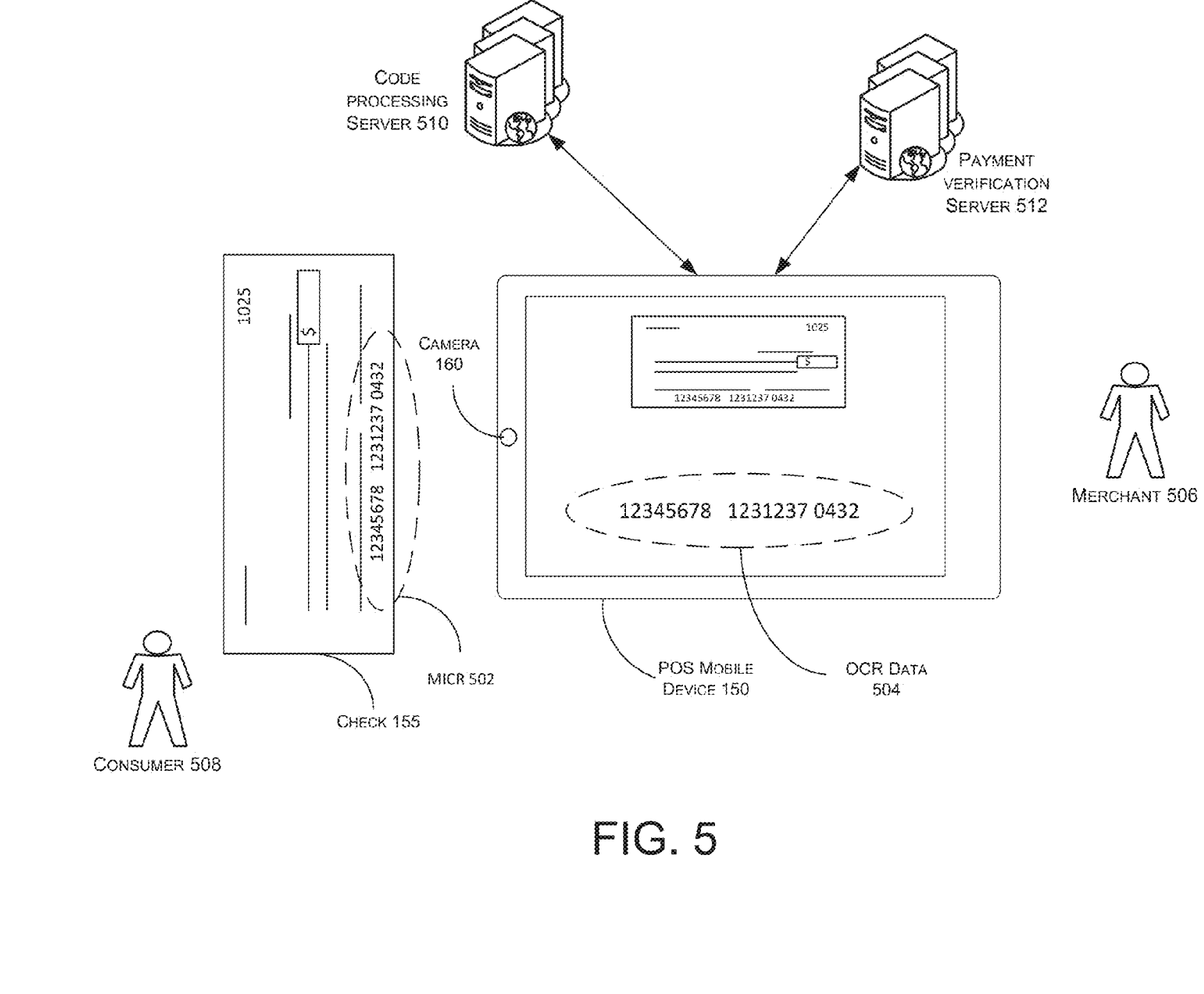
FIG. 5 is a schematic diagram of an example illustration for capturing an image of a transaction document using a POS mobile device in accordance with one or more embodiments of the disclosure.

FIG. 5 is a schematic diagram of an example illustration for capturing an image of a check using a POS mobile device in accordance with one or more embodiments of the disclosure. As explained above, a device stand 100 and/or a POS mobile device 150 may include a camera 160. The camera 160 may be integrated along a different surface of the device stand 100 and positioned to capture an image of a check 155. For example, the camera 160 may be integrated within the POS mobile device 150 that may be positioned on the arm 110 of the device stand 100. In an exemplary illustration, during a sale transaction, a merchant (e.g., merchant 506) may receive a check (e.g., check 155) from a consumer (e.g., consumer 508) who may be purchasing a product. The merchant 506 may place the check 155 within view of the camera 160. The merchant 506 may initiate the capture of the image of the check 155, for example, by pressing a physical button, a button on a touchpad, a button on a touchscreen, etc. The merchant 506 may also initiate the capture of the image of the check 155 by placing the check 155 within view of the camera 160, which may automatically capture an image of the check 155. It is understood that the above is only an example, and that other means of capturing an image of the check 155 may be employed.

The captured image of the check 155 may be rendered on a display of the POS mobile device 150 and/or may be stored in the memory (e.g., memory 404) of the device stand 100 and/or stored in the memory of the POS mobile device 150. The captured image of the check 155 may be an image of the entire check 155 or may be an image of one or more portions of the check 155. For example, the camera 160 may locate a region of the check 155 that may contain MICR information (e.g., MICR 502) and may capture the MICR information (e.g., MICR 502) that may contain identification codes associated with the bank account of the consumer 508. In effect, it may not be necessary to capture the entire image of the check 155.

Characters/digits located within one or more regions of the check 155 may be recognized. For example, the MICR 502 information captured from the check 155 may be recognized using optical character recognition (OCR) functions that may be integrated within the POS mobile device 150 and/or the device stand 100. The recognized data (e.g., MICR 502) may be recognized from the captured MICR 502 information and may be converted to editable and searchable data. The captured and recognized data then may be used to determine identification information of the check 155 that also may be verified with a banking institution by communicating with a financial system (e.g., a code processing server 510 and/or a payment verification server 512) that may provide additional functionality, such as payment verification (e.g., using TeleCheck™) and MICR verification.

The code processing server 510 may verify that the captured MICR information may be valid or invalid. For example, if the captured MICR information is missing a character, the code processing server 510 may respond to the device stand 100 and/or the POS mobile device 150 with an error indication that the captured MICR information is invalid and may present an opportunity to correct the error by either manually entering corrected MICR information or may require the merchant 506 or the consumer 508 to re-swipe the check 155 for re-verification with the code processing server 510. Upon valid verification of the MICR information, the device stand 100 and/or the POS mobile device 150 may communicate that MICR information to a payment verification server 512, which may perform any necessary verification to determine whether the check 155 associated with the consumer 508, for example, has sufficient funds to complete the sale transaction. In case there are insufficient funds and/or there are any other issues with the check 155, the payment verification server 512 may return an error message to the device stand 100 and/or the POS mobile device 150 and present the merchant 506 and the consumer 508 with an opportunity to correct the situation. It is understood that the above is only an example of processing a captured image of a check 155 and that other documents may be processed and captured by the camera 160. Further, although the camera 160 is described as being positioned at the POS mobile device 150, the camera 160 may be positioned in various locations on the POS mobile device 150 and/or the device stand 100.

Figure 6:
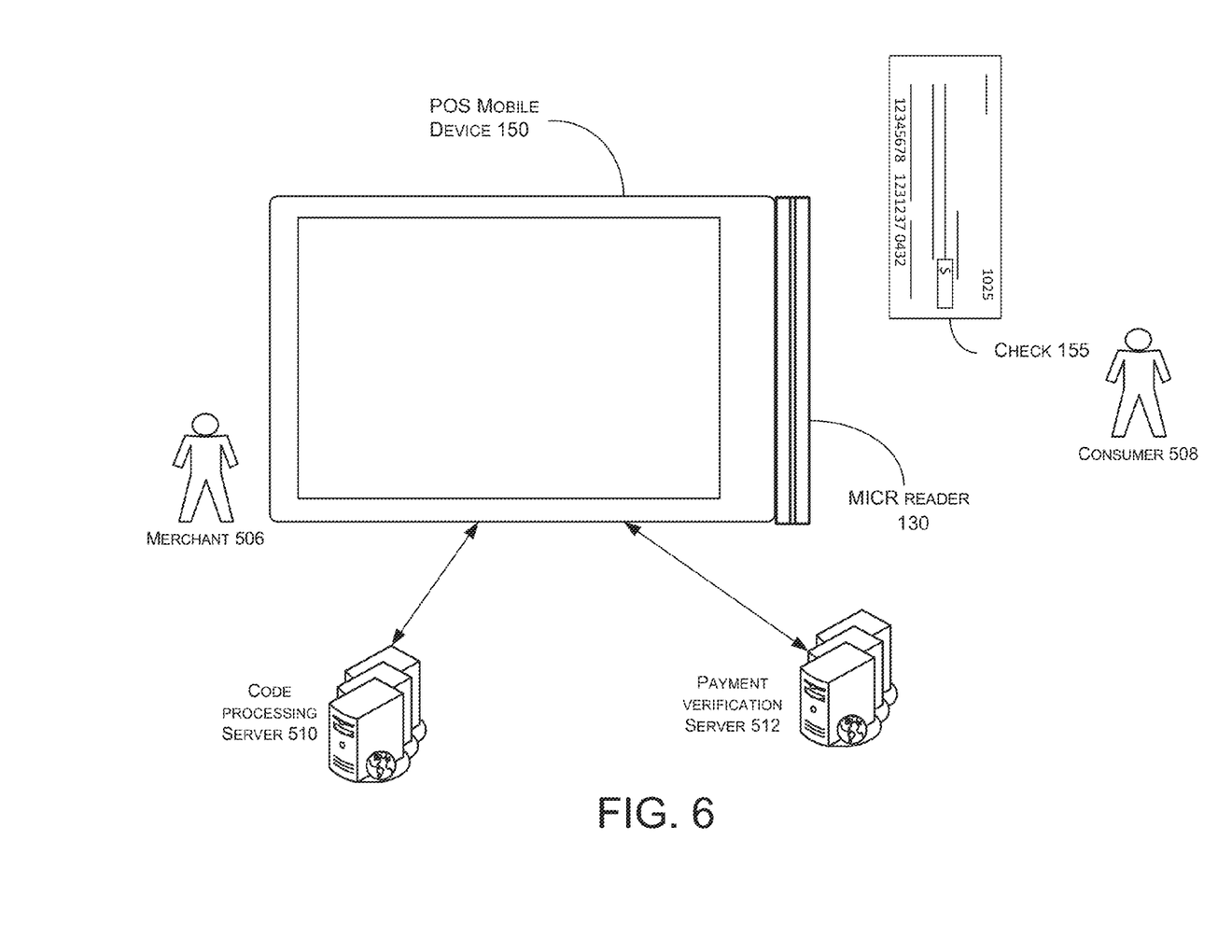
FIG. 6 is a schematic diagram of an example illustration for capturing an image of a check using a device stand for POS mobile devices in accordance with one or more embodiments of the disclosure.

FIG. 6 is a schematic diagram of an example illustration for capturing an image of a check using a POS mobile device in accordance with one or more embodiments of the disclosure.

As explained above, an MICR reader (e.g., the MICR reader 130) may be integrated into the device stand 100 and/or the POS mobile device 150, or any other location. In this example, the MICR reader 130 may be integrated into the POS mobile device 150, which may be connected to the device stand 100 through the mobile device connector 145. During a sale transaction, a merchant (e.g., merchant 506) may receive a check (e.g., check 155) from a consumer (e.g., consumer 508) that may be purchasing a product. The merchant 506 (or the consumer 508) may swipe the check 155 through the MICR reader 130. The MICR reader 130 may detect and recognize the MICR information, which may contain codes such as a document type indicator, a bank code, a bank account number, a check number, etc., which may be located along the bottom of the check 155. The POS mobile device 150, through its connection to the device stand 100, may be connected to a code processing server 510 and/or a payment verification server 512.

The detected and recognized MICR information then may be used to determine identification information of the check 155 that also may be verified with a banking institution by communicating with one or more financial systems that may provide additional functionality, such as payment verification (e.g., using TeleCheck™) and MICR verification.

The code processing server 510 may verify that the captured MICR information may be valid or invalid. For example, if the captured MICR information is missing a character, the code processing server 510 may respond to the device stand 100 and/or the POS mobile device 150 with an error message and may present an opportunity to correct the error by either the merchant 506 manually entering corrected MICR information or the consumer 508 may re-swipe the check 155 for re-verification with the code processing server 510. Upon verification that the MICR information is valid, the device stand 100 and/or the POS mobile device 150 may communicate that MICR information to a payment verification server 512, which may perform any verification necessary to determine whether the check 155 associated with the consumer 508, for example, has sufficient funds to complete the sale transaction. In case there are insufficient funds and/or there are any other issues with the check 155, the payment verification server 512 may return an error message to the device stand 100 and/or the POS mobile device 150 and present the merchant 506 and/or the consumer 508 with an opportunity to correct the situation.

Figure 7:
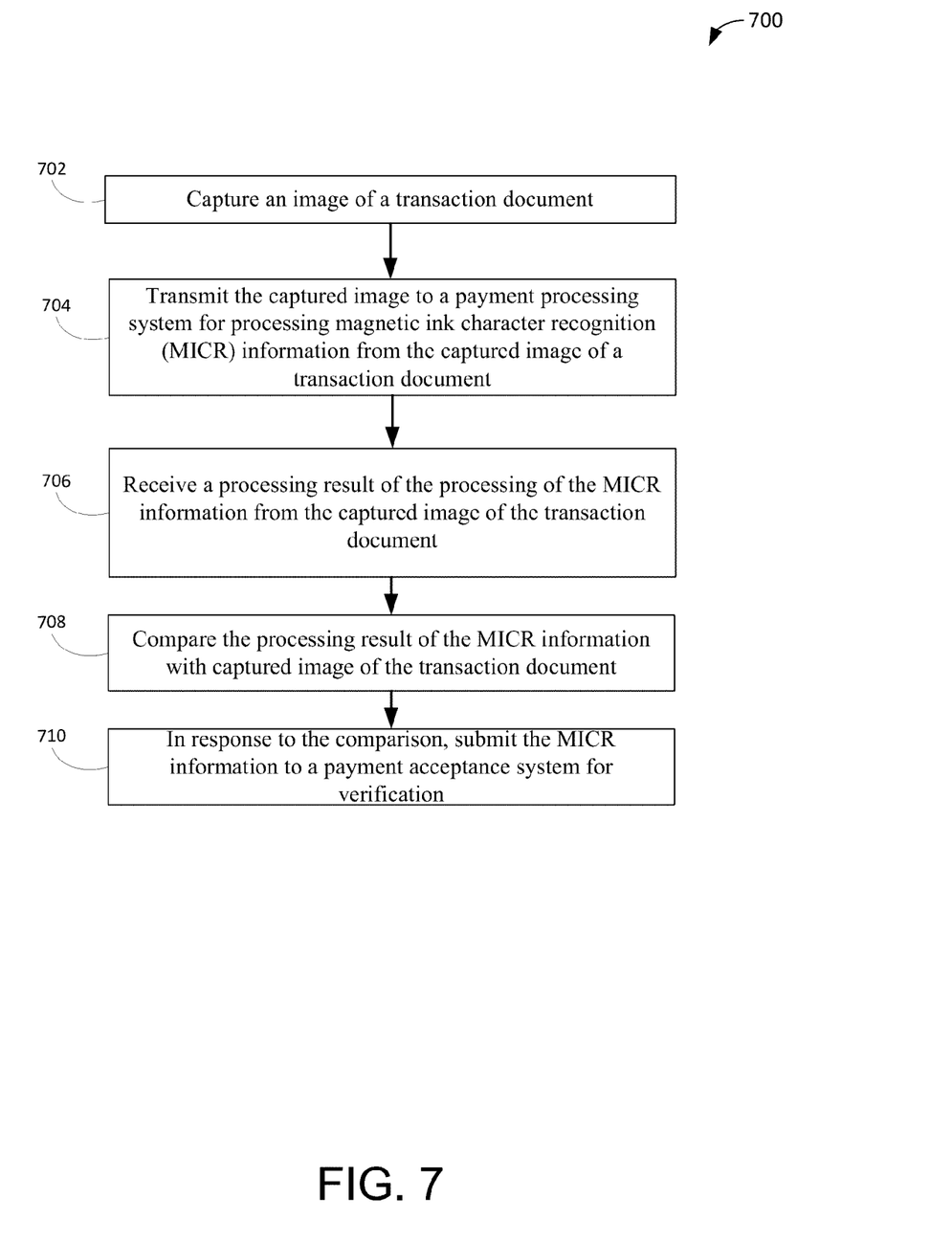
FIG. 7 is a flow diagram of an example method for collecting and processing information from a transaction document using a device stand for POS mobile devices in accordance with one or more example embodiments.

FIG. 7 is a flow diagram of an example method 700 for collecting and processing information from a transaction document using a device stand for POS mobile devices in accordance with one or more example embodiments.

The method 700 may include block 702, in which a computer, such as the device stand 100 for the POS mobile devices 150 may capture an image of a transaction document (e.g., a financial document, a bank check, a cashier's check, etc.). For example, the camera 160 may capture an image of a check 155 that may be placed by a merchant in the viewing area of the camera 160.

At block 704, the method 700 may transmit the captured image to a code processing server 510 that may process the MICR information (e.g., the MICR 502) from the captured image of the transaction document (e.g., a financial document, a bank check, a cashier's check, etc.). It is understood that the processing server (e.g., the code processing server 510) may be co-located or remotely located with the device stand 100 and/or the POS mobile device 150. For example, the code processing server 510 may determine whether the captured MICR information (e.g., the MICR 502) contains proper information for completing the transaction. Some examples of information contained within the MICR information may be routing information, or the bank account number and/or the branch number associated with the consumer 508.

At block 706, the method 700 may receive the result of processing the MICR information contained within the captured image of the transaction document. For example, in case the code processing server 510 was successful in determining that the MICR information (e.g., the MICR 502) is correct, the code processing server 510 may transmit to the device stand 100 and/or the POS mobile device 150 a successful result showing the processed information (e.g., the routing information, the bank account number and/or the branch number associated with the consumer 508, etc.).

At block 708, the method 700 may compare the received result with the captured information (e.g., the MICR 502) of the transaction document (e.g., check 155). This ensures that the captured information and the processed information are the same. In case the received result is different from the captured information, the merchant 506 may correct the information. The merchant 506 may correct the information by at least one of recapturing the image of the transaction document or manually entering the MICR information. It is understood that the above is only an example of how a merchant 506 may correct the captured image of the transaction document. Other ways of correcting the MICR information may be employed.

At block 710, the method 700 may submit the captured information (e.g., the MICR information) of the check 155 to a payment verification server, such as TeleCheck™. For example, in response to comparing the captured information (e.g., the MICR 502) and the processing result of the MICR information, the method 700 may submit the MICR information and/or the captured image of the check 155 to the payment verification server 512 in order to deposit the check 155 into an account associated with the POS system. The payment verification server 512 may reply with an accept/decline message based upon whether there is sufficient funds in the consumer 508 account. It is understood that the above is only an example of the payment verification server 512 and that other scenarios for accepting or declining a transaction document (e.g., a check 155) may be implemented.

Although specific embodiments of the disclosure have been described, numerous other modifications and alternative embodiments are within the scope of the disclosure. For example, any of the functionality described with respect to a particular component of a device stand may be performed by another component or combination of components. Further, while specific device stand characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
providing a base comprising a lip along an edge of the base extending substantially orthogonally from the base, wherein the lip comprises a magnetic ink character recognition (MICR) reader;
providing an arm extending substantially orthogonally from the base;
providing a platform for supporting a mobile computing device by the arm, wherein the platform comprises a connector for a mobile computing device;
capturing, by a camera mounted to the platform and in communication with the mobile computing device, an image of a transaction document positioned adjacent to the platform;
transmitting, by the mobile computing device, the captured image for processing magnetic ink character recognition (MICR) information from the captured image of the transaction document by a banking institution computing device;
receiving, by the mobile computing device, a verification from the banking institution device of the MICR information from the captured image of the transaction document.

2. The method of claim 1, wherein capturing the image of the transaction document includes capturing one or more portions of the transaction document.

3. The method of claim 1, wherein the MICR information includes at least one of information from a check, a document type indicator, a barcode, a bank account number, a check number, or a bank identification number.

4. The method of claim 1, wherein capturing the image of the transaction document may further include converting the captured image into editable and searchable data.

5. The method of claim 1, wherein transmitting the captured image may include at least one of transmitting the captured image through a wired connection, a wireless connection, or an optical connection.

6. The method of claim 1, wherein the mobile computing device is at least one of a tablet, a smartphone, a wearable device, a handheld device, or a mobile point-of-sale (POS) device.

7. The method of claim 1, wherein the verification includes a detection of the MICR codes contained within the transaction document.

8. A system comprising:
a base comprising a lip along an edge of the base extending substantially orthogonally from the base, wherein the lip comprises a magnetic ink character recognition (MICR) reader;

an arm extending substantially orthogonally from the base;

a platform for supporting a computing device by the arm, wherein the platform comprises a connector for the computing device;

a camera mounted to the platform;

at least one memory storing computer-executable instructions; and at least one processor, wherein the at least one processor is configured to access the at least one memory and to execute the computer-executable instructions to:

capture an image of a transaction document via the camera, wherein the transaction document is positioned adjacent to the platform;

transmit the captured image for processing magnetic ink character recognition (MICR) information from the captured image of the transaction document by a banking institution computing device; and     receive a verification from the banking institution device of the MICR information from the captured image of the transaction document.

9. The system of claim 8, wherein the computer-executable instructions to capture the image of the transaction document includes computer-executable instructions to capture one or more portions of the transaction document.

10. The system of claim 8, wherein the MICR information includes at least one of information from a check, a document type indicator, a barcode, a bank account number, a check number, or a bank identification number.

11. The system of claim 8, wherein the computing device is at least one of a tablet, a smartphone, a wearable device, a handheld device, or a mobile point-of-sale (POS) device.

12. The system of claim 8, wherein the computer-executable instructions to capture the image of the transaction document further includes computer-executable instructions to convert the captured image into editable and searchable data.

13. The system of claim 8, wherein the computer-executable instructions to transmit the captured image includes computer-executable instructions to transmit the captured image through a wired connection, a wireless connection, or an optical connection.

14. The system of claim 8, wherein the verification includes a detection of the MICR codes contained within the transaction document.

* * * * *